United States Patent [19]
Klüpfel

[11] Patent Number: 5,533,861
[45] Date of Patent: Jul. 9, 1996

[54] APPARATUS FOR AND METHOD OF PALLETIZING UNIT LOADS

[75] Inventor: Olaf Klüpfel, Ahlen-Vorhelm, Germany

[73] Assignee: Maschinenfabrik Möllers GmbH u. Co., Beckum, Germany

[21] Appl. No.: 386,234

[22] Filed: Feb. 9, 1995

[30] Foreign Application Priority Data

Feb. 9, 1994 [DE] Germany .................. 44 04 017.2

[51] Int. Cl.⁶ .................. B65G 57/03; B65G 57/24
[52] U.S. Cl. .................. 414/794.2; 414/791.6; 414/792.6; 414/792; 198/468.6; 198/614
[58] Field of Search .................. 414/791.6, 792.6, 414/792, 794.2; 198/418.5, 427, 430, 468.6, 614

[56] References Cited

U.S. PATENT DOCUMENTS

| | | | |
|---|---|---|---|
| 3,700,127 | 10/1972 | Kurk et al. | 414/792 |
| 4,255,074 | 3/1981 | Meratti et al. | 414/792 |
| 4,274,780 | 6/1981 | Kaul et al. | 414/792.6 |
| 4,439,084 | 3/1984 | Werkheiser | 414/792 |
| 4,518,074 | 5/1985 | Langner et al. | 198/468.6 |
| 5,135,351 | 8/1992 | Rathert | 414/792.6 |
| 5,372,472 | 12/1994 | Winski et al. | 414/792 |

FOREIGN PATENT DOCUMENTS 8000829  5/1980  WIPO .................. 414/792

*Primary Examiner*—Karen B. Merritt
*Assistant Examiner*—Douglas A. Hess
*Attorney, Agent, or Firm*—Anderson Kill Olick & Oshinsky

[57] ABSTRACT

An apparatus for palletizing unit loads including an input roller conveyor, a guide displaceable between the driven rollers of the input roller conveyor and having a plurality of stirrup-shaped elements liftable above and sinkable below the upper surface level of the rollers and having a stepped upper surface with at least two unit load supporting surfaces, a stacker located adjacent to and sidewise of the input roller conveyor, and a sliding device for shifting a unit load layer formed in the waiting area of the input roller conveyor onto the stacker; with the method of palletizing unit loads with the use of the palletizing apparatus including sequentially lifting rows of unit loads with stepped support surfaces of the stirrup-shaped element above the upper surface level of the input roller conveyor and displacing the lifted rows into the waiting area, and lowering the guide so that the unit load support surfaces are located beneath an upper surface level of the waiting area, whereby the first and second rows are deposited onto the upper surface of the waiting area.

7 Claims, 4 Drawing Sheets

APPARATUS FOR AND METHOD OF PALLETIZING UNIT LOADS

BACKGROUND OF THE INVENTION

The invention relates to an apparatus for palletizing unit loads for forming a stack of unit loads and including a unit load feeder, an intermittent conveyor for separating the unit loads, and an input roller conveyor having a plurality of driven rollers and a waiting area, with the unit load feeder, the intermittent conveyor and the input roller conveyor being displaceable in the same direction. A guide is displaceable between rollers of the input roller conveyor for displacing the unit loads from a driven roller region to the waiting area. The guide comprises a plurality of guide elements adapted to be lifted above and sank beneath an upper surface level of the rollers of the input roller conveyor. The apparatus also includes a stacker for forming stacks of the unit loads and located adjacent to and sidewise of the input roller conveyor, and sliding means for shifting a unit load layer formed in the waiting area of the input roller conveyor onto the stacker.

The invention also recites a method of palletizing unit loads effecting with the above-described palletizing apparatus and including feeding the unit loads with the unit load feeder to the intermittent conveyor, separating the unit loads fed to the intermittent conveyor into groups of a predetermined number of unit loads on the intermittent conveyor and, thereafter, feeding the predetermined number of unit loads from the intermittent conveyor to the input roller conveyor. The method further includes forming the predetermined number of unit loads fed to the input roller conveyor into rows of unit loads, lifting a first row of unit loads with the stirrup-shaped elements of the guide above the upper surface level of the input roller conveyor and displacing the first row sidewise into the waiting area, returning the guide to its initial position, and, thereafter, lifting a second row of unit loads with stirrup-shaped elements above the upper surface level of the input roller conveyor and displacing the guide with the second row into the waiting area. The method also includes displacing the unit load layer formed of the first and second rows onto the stacker.

The above-described apparatus and method are generally known (please see, e.g., a prospectus of the assignee of the present application "Bag Palletizing Apparatus"). The known apparatus and method permits the forming of layers of unit loads arranged according to a predetermined pattern, with some of the unit loads being pivoted by 90° before their separation into groups of unit loads. A group can consist of single unit loads spaced from each other, or of sets of two or three unit loads abutting each other. The separation unit loads into groups is effected on the intermittent conveyor, before transfer of the unit loads to the input roller conveyor. In the known apparatus, after a single row has been formed on the input roller conveyor, the guide lifts the row and displaces it sidewise into the waiting area of the input roller conveyor. Thereafter, the guide returns to its initial position and lifts the next row of unit loads formed on the input roller conveyor and displaces it into the waiting area and so forth, until a complete layer is formed. The complete layer is then shifted by the sliding device sidewise onto two horizontal, movable apart from each other slide plates of the stacker. The layer of unit loads, supported on the two slide parts, upon movement of the plates away from each other is deposited onto a pallet, which is located beneath the two slide plates. Such an apparatus permits one to achieve a substantial output capacity of about a thousand bag-shaped unit loads per hour. However, there is a need to increase this output capacity.

Accordingly, an object of the invention is an apparatus for and a method of palletizing unit loads with a high output capacity.

SUMMARY OF THE INVENTION

This and other objects of the invention, which will become apparent hereinafter, are achieved by providing a displacing guide having a stepped outer surface with at least two unit load support surfaces, with each stepped support surface being adapted to be lifted above the upper surface level of the input roller conveyor.

The guide having a stepped outer surface permits to significantly increase the output capacity of the palletizing apparatus and, thereby, significantly reduce the time of forming a stack. This is because the stepped support surfaces of the guide elements of the displacing guide permit first to lift a first row of the unit load layer with the highest support surface and displace it sidewise into the waiting area a distance, at which the next lower support surface still remains in the row-forming region of the input roller conveyor. Then, the next lower support surface lifts the next row, upon the guide being lifted, and displaces it also into the waiting area, while the first row of unit loads is still supported on the first, highest support surface, and so forth. Thus, the guide, during forming a layer of unit loads, is displaced only in one direction and there is no need, as in the conventional apparatuses, to constantly move the guide back and forth to form a single layer in the waiting area, and a first row of a next layer can start to be formed as soon as the guide moves the rows of the previous layer, together, into the waiting area.

According to the advantageous embodiment of the apparatus according to the present invention, the driven rollers of the input roller conveyor are enveloped with freely rotatable tubular sheaths. This enables a pressureless displacement of the unit loads from the intermittent conveyor onto the feed roller conveyor even when the intermittent and input roller conveyors operates with different speeds, which is advantageous for achieving a high drive rate.

Advantageously, the drive for driving the drive rollers of the feed roller conveyor is steplessly or continuously controlled. This enables to steplessly change the speed of the driven rollers, e.g., to increase it as soon as a complete set of unit loads forming a layer is displaced onto the unit roller conveyor from the intermittent conveyor.

The object of improving the method of palletizing the unit loads is achieved by lifting a first row of unit loads with a first, highest support surface of the guide elements of the guide above the upper surface level of the input roller conveyor and displacing the first row sidewise a distance such that a next lower support surface is still located in the region of the driven rollers, thereafter lifting a second row of unit loads with a second support surface of the guide elements above the upper surface level of the feed roller conveyor, displacing the guide with the first row being still supported on the first support surface of the guide into the waiting area, and lowering the guide so that the unit load support surfaces are located beneath an upper surface level of the waiting area, whereby the first and second rows are deposited simultaneously onto the upper surface of the waiting area.

For effecting the inventive process, it is not necessary to displace the guide, during forming a unit load layer, back and forth for displacing single rows of unit loads forming the layer. Rather, during forming of a unit load layer, the guide is displaced by steps in the same direction so that after displacing a row, it can immediately displace the next row.

In a particular advantageous embodiment of the invention, it is contemplated to drive the driven rollers of the input roller conveyor with a speed, which is at least 10% less than the speed of the pulse conveyor. Because of the reduced speed of the input roller conveyor, it is possible to accelerate the formation of the separate rows of a unit load layer. Simultaneously, the separate unit loads can pressurelessly be advanced against a stop plate at the end of the input roller conveyor, which is especially advantageous when bags are palletized.

It is further advantageously contemplated to increase the speed of the driven rollers as soon as a complete set of unit loads, forming a row, is in the region of the input rollers conveyor. This further decreases the time period necessary for forming a row of unit loads. It is further possible to transfer the unit loads forming a row from the intermittent conveyor to the input roller conveyor together, as a set, or individually. This depends on local conditions and the size of a separate set of unit loads forming the row. To further reduce the time of forming a stack, it is further contemplated for the guide to displace a first row of a next row unit load layer sidewise into the waiting area before the slide plates of the displacing device move to their closed position after the previous layer of unit loads was deposited onto a pallet.

BRIEF DESCRIPTION O THE DRAWINGS

The objects and features of the present invention will become more apparent, and the invention itself will be best understood from the following detailed description of the preferred embodiment, when read with references to the accompanying drawings, wherein.

DETAILED DESCRIPTION OF THE PREFERRED EMBODIMENT

Figure 1:
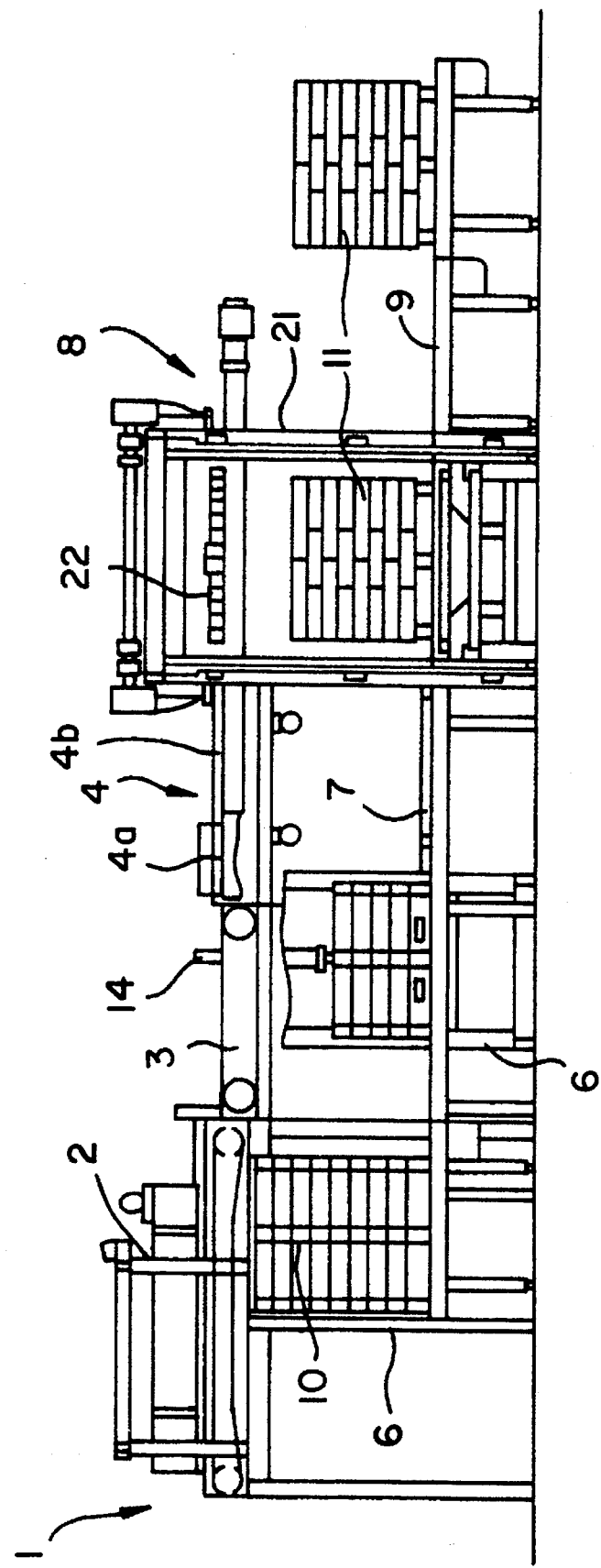
FIG. 1 is a side view of a palletizing apparatus according to the present invention.

FIG. 1 shows an apparatus 1 for palletizing unit loads according to the present invention. The apparatus 1 includes a unit load feeder 2, a turning device 3, intermittent conveyor 4, and an input roller conveyor 5, which are arranged one after another in the displacement direction 13. Parallel to the above-described means for delivering unit loads, there are provided an empty pallet transporter 7, a unit load stacker 8, and a conveyor 9 for transporting the stacks of unit loads, which is arranged at the output side of the stacker 8. A plurality of empty pallets 10 are arranged one above the other in the empty pallet accumulator 6. For forming a stack of unit loads 11, the empty pallets 10 one after another is transported to the load unit stacker 8 by the empty pallet transporter 7.

In the load unit stacker 8, separate stack layers are formed in the region of the input roller conveyor 5 in a manner, which will be described in detail below. After the stack 11 of unit loads is formed, it is delivered from the unit load stacker 8 onto the conveyor 9 which transport the stacks 11 of unit loads further away, as required.

Figure 2:
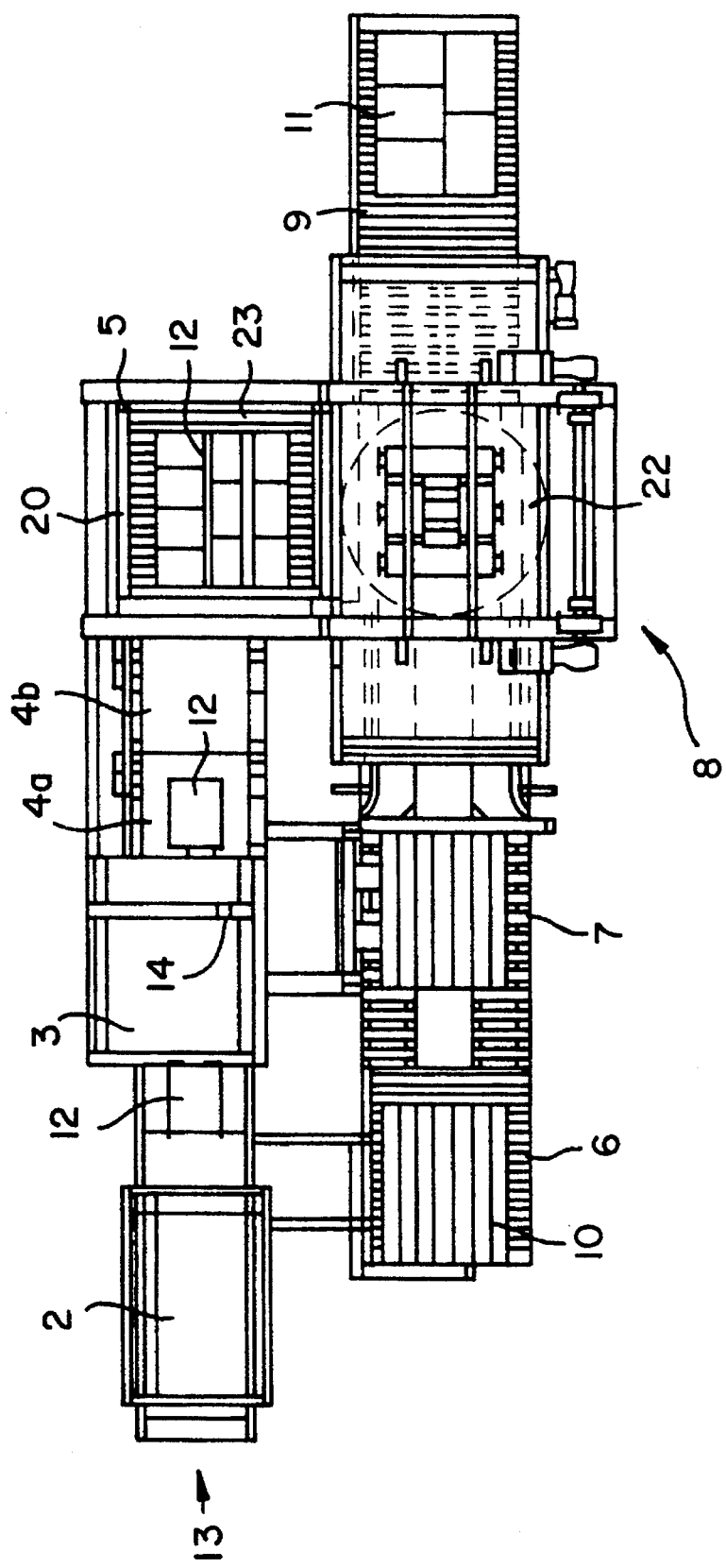
FIG. 2 is a top view of the apparatus shown in FIG. 1.

As shown in FIG. 2, separate unit loads 12, which in the described example represent bags, are delivered by a feeder 2. The unit loads 12 are so arranged on the feeder 2 that their longitudinal sides extend parallel to the displacement direction 13. If a load unit in order to form a particular stack need be turned by 90°, the turning is effected by the turning device 3, which is, in a per se known manner, is equipped with a pivotal operator 14.

From the turning device 3, the separate unit loads 12 are displaced in the region of the intermittent conveyor 4 which, in the described example, is formed of two, arranged one after another timing belts 4a and 4b. The intermittent conveyor 4 makes it possible, by correspondingly driving the timing belts 4a, 4b, to separate the incoming unit loads 12, as needed. This means that, dependent upon the size of the unit loads 12, they can be delivered to the input roller conveyor 5 either separately or directly one after another.

The input roller conveyor 5 has along the width of the intermittent conveyor 4, a plurality of driven rollers 15 and a sidewise waiting area 16 which is located adjacent to the unit load stacker 8. The waiting area 16 has a plurality of idle rollers 17 coaxially arranged with the driven rollers 15, respectively. The driven rollers 15 as well as the idle rollers 17 are arranged as a predetermined distance from each other, with a displaceable guide 18 arranged between the rollers 15 or 17 and extending in a direction transverse to the displacement direction 13. The guide 18 is formed of a plurality of guide liftable elements 19 adapted to be lifted above or sank below the surface level of the input roller conveyor 5. The guide liftable elements 19 have a thickness smaller than a respective distance between the rollers 15 or 17, so that lifting of the guide 18 is possible. In the elevated condition, the guide elements 19 extend between the rollers 15 above the surface level of the input roller conveyor 5, whereby lifting of a unit load 12 in the region of the input roller conveyor 5 is possible. addition, the input roller conveyor 5 is provided with a sliding device 20, which is shown only in FIG. 2, for displacing the already formed unit load stacks from the input roller conveyor 5 onto the stacker 8, which is arranged at the side of the roller conveyor 5.

As shown in FIGS. 1 and 2, the unit load stacker 8 includes a frame 21 and two slide plates 22 provided on the frame 21 and displaceable in a horizontal direction apart from each other. The slide plates 22 are so arranged relative to the input roller conveyor 5 that the unit load stack, formed on the input roller conveyor 5, is displaced directly onto the slide plates 22 by the sliding device 20 after the stack layer has been; shifted onto the stacker 8 or simultaneously therewith, a pallet 10, empty or with unit load layers stacked thereon, is moved vertically upward to beneath the slide plates 22, to receive the unit load layer, which was displaced onto the plates 22. The deposition of the unit load layer, which is supported on the slide plate 22, is effected by horizontally displacing the plates 22 apart from each other, so that the unit load layer, located thereon, falls onto the empty or already partially loaded pallet 10, which is located beneath the plates 22. Then the slide plates 22 are moved toward each other for receiving the next unit load layer from the roller conveyor 5. Simultaneously, the pallet 10, together with the stack formed thereon is lowered down by an amount corresponding to the height of one unit load layer.

Figure 3:
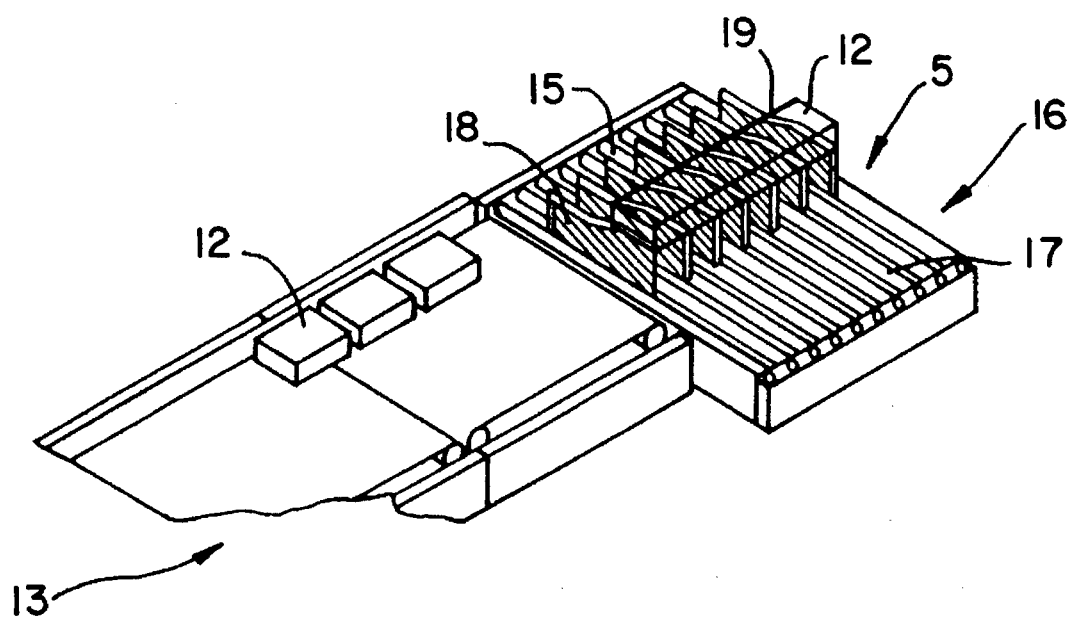
FIGS. 3 and 4 are top views of an input roller conveyor of an apparatus according to the present invention with a load unit being in two different positions, respectively.
Figure 4:
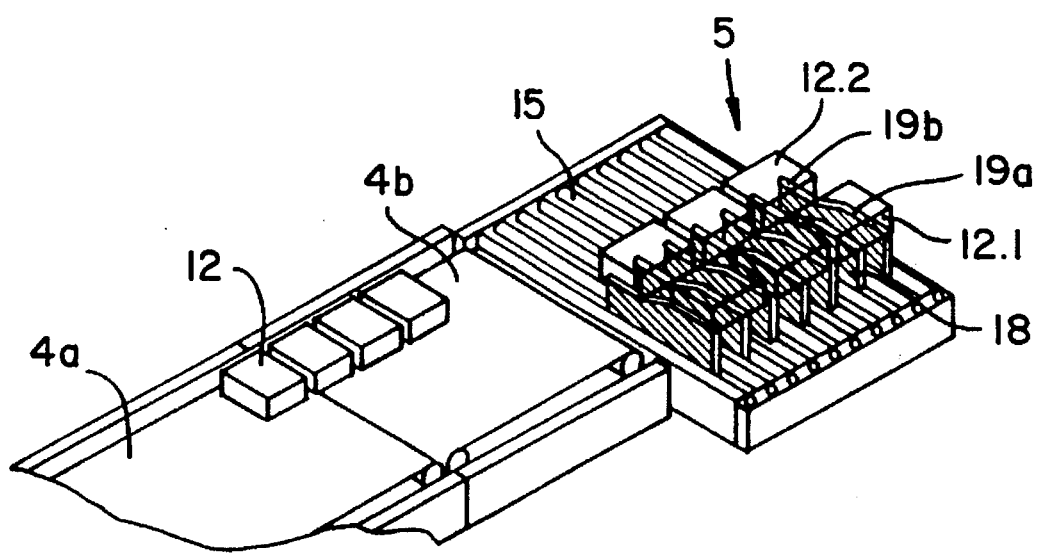

The important feature of the present invention is the shape of the guide 18 of the input roller conveyor 5. As shown in FIGS. 3, 4 and 5, the guide element 19 of the guide 18 has, on its upper surface, at least two unit load supporting surfaces or steps 19a and 19b, adapted to be lifted above the surface level of the rollers. At that, the guide is so formed that the relatively higher step 19a of the lift element 19 is arranged on a side of the guide 18, which is immediately adjacent to the waiting area 16 of the roller conveyor 5 or to the stacker 8.

Due to this shape of the guide elements 19, the palletizing process during forming of a stack is substantially sped up, as it follows from the following description of the palletizing process, with reference to FIG. 5.

Figure 5A:
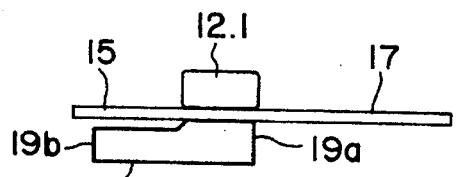
FIGS. 5a–5b are simplified side views of the feed roller conveyor in different feed positions.
Figure 5B:
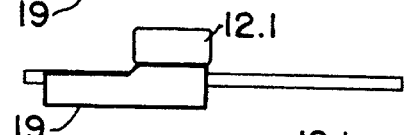
Figure 5C:
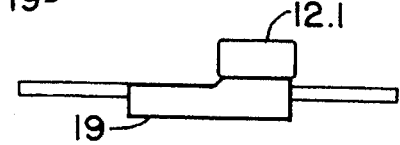

As soon as the intermittent conveyor 4 delivers to the roller conveyors (FIG. 5a) one after another, unit loads 12 of the first unit load row 12.1 (FIG. 6), the guide 18 lifts, with its guide elements 19, the first row 12.1 of the unit load layer with the higher steps 19a (FIG. 5b) and displaces this first row 12.1 in the waiting area 16 so far that the steps 19b of the stirrup-shaped lift elements 19 still remain in the area of the roller conveyor 5, that is in the area of rollers 15 (FIG. 5c).

Figure 5D:
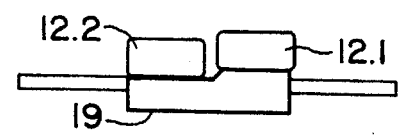
Figure 5E:
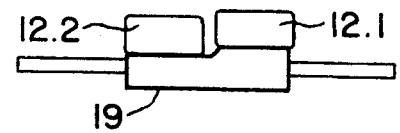
Figure 5F:
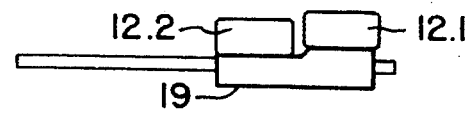
Figure 5G:
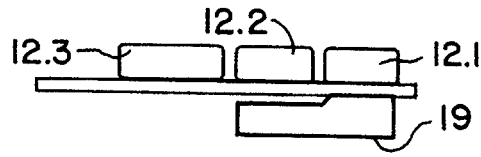
Figure 5H:
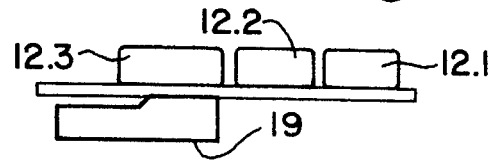
Figure 6:
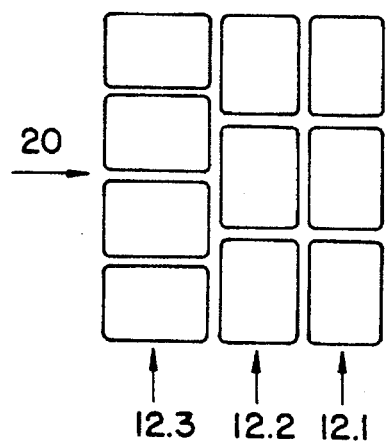
FIG. 6 is a top view of a pattern of a stack formed in accordance with feed steps shown in FIG. 5.

As soon as the process step shown in FIG. 5c ends, i.e., the first row 12.1 is shifted sidewise from the region of the driven rollers 15, immediately thereafter, a second row of unit loads is delivered beneath which, the lower steps 19b of the guide elements 19 are located (FIG. 5d). As shown in FIG. 5e, the guide elements 19 of the guide 18 are then further lifted upward, so that the lower supporting steps 19b are above the surface level of the rollers 15 and, thereby they lift the unit loads 12 of the second row 12.2. Finally, the guide 18 is displaced completely to the right (FIG. 5f), together with the rows 12.1 and 12.2 of the unit loads. Then, the guide 18 is lowered down to an extent that both steps 19a and 19b are located beneath the upper surfaces of the rollers 15 or rollers 17 (FIG. 5g). Thereafter, the guide 18 is shifted to the left into the region of the roller conveyor 5 (FIG. 5h) to its initial position for forming the third row 12.3 of the unit loads 12. The third unit load row 12.3 is formed, in the example shown in FIGS. 5 and 6 of unit loads 12, which are turned by 90°. The guide 18 remains in the position shown in FIG. 5h, that is, it does not lift the unit loads 12 of the third row 12.3, because according to this example, the desired stack layer is already complete. This completed stack layer of unit loads 12, shown in FIG. 6, is then shifted by the sliding device 20, which is designated in FIG. 6 with an arrow 6, onto the slide plates 22 of the stack 18, as described above.

From the foregoing description of the guide 18 with its stepped guide elements end 19, it should be clear that reciprocating movement of the guide 18 is not needed for a sidewise displacement of rows 12.1 and 12.2 in the waiting area 16. This significantly accelerates the palletizing process. Clearly, when a unit load layer consists of more than three rows, the guide 18 can have more than two steps or surfaces, 19a, 19b. The guide 18 can have, e.g., three steps, when the formed unit load layer consists of four rows of unit loads, etc.

Advantageously, the rollers 15 of the roller conveyor 5 can be enveloped with freely rotatable tubular sheath, e.g., made of TEFLON™. The drive of the rollers 15 can be formed continuously adjustable. The advantage of this consists in that, during forming of a layer, the drive of the rollers 15 can be made operable with a speed about 10% smaller than the speed of the intermittent conveyor, with a subsequent stepless or continuous increase of the speed of the drive of rollers 15 after a complete row of unit loads 12 is formed in the region of the roller conveyor 5. This enables a faultless transfer of the unit loads from the intermittent conveyor 4 to the roller conveyor 5, an accelerated layer formation and, at the same time, pressureless displacement of unit loads 12 of a unit load row against a stop plate 23 at the end of the roller conveyor 5. Further, acceleration of the palletizing process is achieved due to the fact that the guide 18 already displaces sidewise the next row 12.1 of the next layer before the slide plates 22, after the deposition of the previously formed layer onto the pallet, are displaced to their closed position, that is, the guide 18 displaces the next row of the next layer with the slide plates 22 still in their open position.

Though the present invention was shown and described with reference to a preferred embodiment, various modification thereof will be apparent to those skilled in the art and, therefore, it is not intended that the invention be limited to the disclosed embodiment or details thereof, and departure can be made therefrom within the spirit and scope of the appended claims.

What is claimed is:

1. A method for palletizing unit loads for forming a stack for unit loads including a plurality of layers, with each layer having at least two rows of the unit loads, said method comprising the steps of providing:

a palletizing apparatus comprising a unit load feeder, an intermittent conveyor for separating the unit loads into groups of a predetermined number of unit loads, an input roller conveyor having a plurality of driven rollers and a waiting area, with the unit load feeder, the intermittent conveyor and the input roller conveyor being displaceable in a same direction, guide means displaceable between rollers of the input roller conveyor for displacing the unit loads from a driven roller region of the input roller conveyor to said waiting area, the guide means comprising a plurality of guide elements adapted to be lifted above and sank beneath an upper surface level of the rollers of the input roller conveyor, the guide elements having a stepped upper surface having at least two unit load support surfaces, and the support surfaces being located above the upper surface level of the rollers in a completely lifted position of the guide means, a stacker for forming stacks of the unit loads and located adjacent to and sidewise of said input roller conveyor, and sliding means for shifting a unit load layer formed in said waiting area of said input roller conveyor onto said stacker;

feeding the unit loads with the unit load feeder to the intermittent conveyor;

separating the unit loads fed to the intermittent conveyor into groups of a predetermined number of unit loads on the intermittent conveyor;

thereafter, feeding the predetermined number of unit loads from the intermittent conveyor to the input roller conveyor;

forming the predetermined number of unit loads fed to the input roller conveyor into rows of unit loads;

lifting a first row of unit loads with a first, highest support surface of the guide elements of the guide means above the upper surface level of the feed roller conveyor and displacing the first row sidewise a distance such that a next lower support surface is still located in the region of the driven rollers;

lifting a second row of unit loads with a second support surface of the guide elements above the upper surface level of the feed roller conveyor, displacing the guide means, with the first row being still supported on the first support surface of the guide means, into the waiting area, and lowering the guide means so that the unit support surfaces are located beneath an upper surface level of the waiting area, whereby the first and second rows are deposited onto the upper surface of the waiting area; and displacing the unit load layer formed of the first and second rows from the waiting area onto the stacker.

2. A method as set forth in claim 1, comprising the steps of driving the driven rollers of the input roller conveyor with a speed that is at least 10% smaller than a speed of the intermittent conveyor.

3. A method as set forth in claim 2, further comprising the step of continuously increasing the speed of the drive rollers immediately after a complete set of unit loads of one of row unit loads has been transferred into a region of the input roller conveyor.

4. A method as set forth in claim 1, wherein the step of feeding the predetermined number of unit loads from the intermittent conveyor to the input roller conveyor includes feeding the unit loads either one-by-one or as a complete set.

5. A method as set forth in claim 1, further comprising the steps of:

providing a slide device for displacing the completely formed layer from the waiting area onto the stacker and including two slide plates movable in a horizontal direction toward and apart from each other for supporting a unit load layer and for depositing the layer onto a pallet located beneath the slide plates, respectively; and displacing a first row of a next layer into the waiting area before the slide plates move into a unit load layer supporting position thereof.

6. An apparatus for palletizing unit loads for forming a stack of unit loads, said apparatus comprising:

a unit load feeder;

an intermittent conveyor for separating the unit loads into groups of a predetermined number of unit loads;

an input roller conveyor having a plurality of driven rollers and a waiting area, said unit load feeder, said intermittent conveyor and said input roller conveyor being displaceable in a same direction;

guide means displaceable between rollers of said input roller conveyor for displacing the unit loads from a driven roller region of said input roller conveyor to said waiting area, said guide means comprising a plurality of guide elements adapted to be lifted above and sank beneath an upper surface level of said rollers of said input roller conveyor, said guide elements having a stepped upper surface having at least two unit load support surfaces, and said support surfaces being located above said upper surface level of said rollers in a completely lifted position of said guide means;

a stacker for forming stacks of the unit loads and located adjacent to and sidewise of said input roller conveyor; and sliding means for shifting a unit load layer formed in said waiting area of said input roller conveyor onto said stacker;

wherein said driven rollers of said input roller conveyor are each covered with a freely rotatable tubular sheath.

7. An apparatus for palletizing unit loads for forming a stack of unit loads, said apparatus comprising:

a unit load feeder;

an intermittent conveyor for separating the unit loads into groups of a predetermined number of unit loads;

an input roller conveyor having a plurality of driven rollers and a waiting area, said unit load feeder, said intermittent conveyor and said input roller conveyor being displaceable in a same direction;

guide means displaceable between rollers of said input roller conveyor for displacing the unit loads from a driven roller region of said input roller conveyor to said waiting area, said guide means comprising a plurality of guide elements adapted to be lifted above and sank beneath an upper surface level of said rollers of said input roller conveyor, said guide elements having a stepped upper surface having at least two unit load support surfaces, and said support surfaces being located above said upper surface level of said rollers in a completely lifted position of said guide means;

a stacker for forming stacks of the unit loads and located adjacent to and sidewise of said input roller conveyor; and sliding means for shifting a unit load layer formed in said waiting area of said input roller conveyor onto said stacker;

wherein said input roller conveyor comprises drive means for driving said driven rollers, and means for steplessly controlling said drive means.

* * * * *